Figure 1:
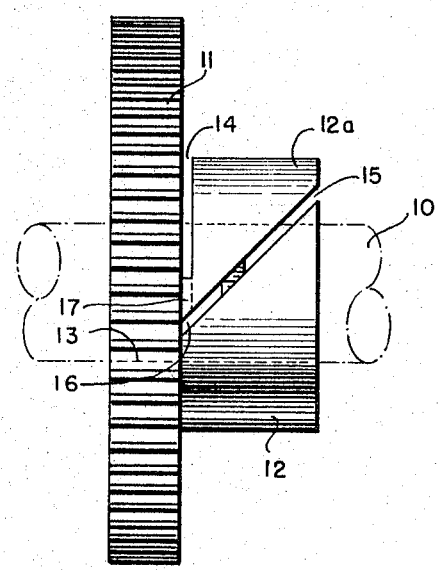

March 7, 1967 S. I. GREENE 3,307,418
CLAMPABLE PRECISION HUB
Filed Feb. 26, 1965

United States Patent Office 3,307,418
Patented Mar. 7, 1967

3,307,418
CLAMPABLE PRECISION HUB
Sanford I. Greene, Wantagh, N.Y., assignor to Fairchild Camera and Instrument Corporation, a corporation of Delaware
Filed Feb. 26, 1965, Ser. No. 435,665
7 Claims. (Cl. 74—434)

This invention relates to clampable precision hubs and, while it is of general application, it is particularly adapted for embodiment in a gear for clamping the gear to a supporting shaft in any desired angular position.

The age-old problem of securing gears, pulleys, couplers, and the like to a shaft has been accentuated in recent years by the growth of precision mechanical computers utilizing complex gear assemblies, each of the gears of which must be secured to its shaft rigidly in any desired angular position, such setting frequently being required to be made after assembly. Further, such assemblies frequently operate at extremely high speeds so that its becomes important that the gears be dynamically balanced.

In applicant's prior Patent 3,139,296, there are discussed in some detail the shortcomings of prior art arrangements for adjustably securing a precision gear to a supporting shaft in any desired angular position, even after assembly in a gear train. That patent describes and claims a precision clampable gear which overcomes the shortcomings of the prior art arrangements, the gear comprising essentially a gear body and a cylindrical collar integral therewith having a continuous bore extending therethrough and two longitudinally spaced transverse radial slots through a substantial portion of the collar, one adjacent the gear body. The gear further comprises a longitudinal second slot through at least a portion of the collar and lying substantially in an axial plane thereof, such second slot extending between and intersecting the two radial slots. A clamping screw passes through a portion of the collar on one side of the longitudinal slot and is threaded into a portion of the collar on the opposite side thereof for drawing together portions of the collar on opposite sides of the longitudinal slot to clamp the gear upon a supporting shaft.

While the clampable precision gear described and claimed in aforesaid patent is eminently satisfactory from an operational standpoint, it is relatively costly to manufacture since the longitudinal slot intersecting the two transverse radial slots cannot be formed by ordinary milling or sawing processes but involves a special costly and time-consuming metal-cutting process.

It is an object of the present invention, therefore, to provide a new and improved clampable precision hub having all of the operational advantages of the clampable precision gear described in aforesaid Patent 3,139,296 but one which can be fabricated economically by ordinary rapid milling processes.

In accordance with the invention, there is provided a precision hub clampable in any desired angular position on a supporting shaft comprising a hub body having a bore therein, a radial first slot extending through a substantial portion of the hub body, a second slot extending through a substantial portion of the hub body in a plane inclined inwardly toward and at an acute angle to the radial slot and intersecting it at only one side of the hub body, and means for drawing together portions of the hub body on opposite sides of said inclined slot in the vicinity of its intersection with the radial slot to clamp the hub on a supporting shaft.

For a better understanding of the present invention, together with other and further objects thereof, reference is had to the following description, taken in connection with the accompanying drawing, while its scope will be pointed out in the appended claims.

Figure 2:
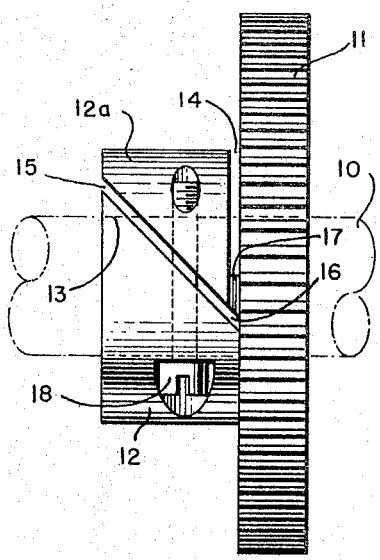

Referring to the drawing:

FIG. 1 is a view, in elevation, of a precision clampable gear embodying the precision clampable hub of the invention, while FIG. 2 is a similar view of the device of FIG. 1 from the opposite side.

Referring now more particularly to FIGS. 1 and 2 of the drawing, there is illustrated a precision hub clampable in any desired angular position on a supporting shaft 10 shown in dotted lines since it per se forms no part of the present invention. This gear comprises a gear body consisting of a flange 11 in which conventional gear teeth are cut and an integral hub 12 having a bore 13 either extending therethrough, as shown, or at least through the hub portion 12. The precision hub further comprises a radial slot 14 extending through a substantial portion, specifically approximately half-way through, the body of the hub 10 adjacent the gear flange 11.

The precision hub of the invention further comprises a second slot 15 extending through a substantial portion of the body, preferably through a portion greater than than of the radial slot in the plane thereof. This second slot lies in a plane inclined inwardly toward, and at an acute angle to, the radial slot 14 and intersects it only at one side of the hub, as at 16. The result is that a portion 12a of the hub 12 is completely severed from the remaining portion of the gear body except for a short connecting neck 17 lying between the radial slot 14 and the inclined slot 15 near the face of the gear flange. The inclined slot 15 may, as shown, intersect the end face of the hub 12 opposite the radial slot 14 outside of the bore 13 or it may emerge from the hub between its end face and the flange 11, depending upon the dimensions of the hub and the angle of inclination of the slot 15. With this arrangement, the outer portion of the hub 10, removed from the gear flange 11, constitutes a continuous annulus which, with the gear flange 11, assists in maintaining accurate alignment of the gear on the shaft 10.

The precision hub of the invention further comprises means for drawing together portions of the hub 12 on opposite sides of the inclined slot 15 in the vicinity of its intersection with the radial slot 14 to clamp the hub 12 on a supporting shaft 10. Specifically, this latter means comprises a clamping screw 18 passing through the portion of the hub 12 below the inclined slot 15, as seen in FIGS. 1 and 2, in the vicinity of its intersection with the radial slot 14, and is threaded into the upper portion 12a of the hub body on the opposite side of the inclined slot 15.

It is believed that the operation of the clampable precision hub of the invention will be apparent from the foregoing description. When embodied in a clampable gear, as shown in FIGS. 1 and 2, it may be slipped onto the shaft 10 in a conventional manner, adjusted to its proper position, and secured by tightening the screw 18. The upper portion 12a of the hub, connected to the remaining portion of the body only by the link 17, has a considerable flexibility and can be readily flexed to secure a firm clamping action on the shaft 10. At the same time, the unslotted outer face of the hub 12 and the gear flange 11 have a considerable longitudinal spacing, thus ensuring accurate axial alignment between the gear and the shaft to which it is secured.

The clampable hub illustrated and described, from an operational standpoint, has the same advantages as described in detail in applicant's aforesaid Patent 3,139,-296. However, it is seen that the gear blank with its integral hub can be fabricated by two simple milling cuts, forming the slots 14 and 15, which can be effected rapidly and economically.

While the precision clampable hub of the invention has been illustrated as embodied in a precision gear, it will be understood that it is equally applicable as an integral part of a pulley, shaft coupler, and the like.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A precision hub clampable in any desired angular position on a supporting shaft comprising:
   a hub body having a bore therein;
   a radial first slot extending through a substantial portion of said body;
   a second slot extending through a substantial portion of said body in a plane inclined inwardly toward and at an acute angle to said radial slot and intersecting it at only one side of said hub body;
   and means for drawing together portions of said body on opposite sides of said inclined slot in the vicinity of its intersection with said radial slot to clamp said hub on a supporting shaft.

2. A precision hub clampable in any desired angular position on a supporting shaft comprising:
   a hub body having a bore therein;
   a radial first slot extending substantially half-way through said body;
   a second slot extending through a substantial portion of said body in a plane inclined inwardly toward and at an acute angle to said radial slot and intersecting it at only one side of said hub body;
   and means for drawing together portions of said body on opposite sides of said inclined slot in the vicinity of its intersection with said radial slot to clamp said hub on a supporting shaft.

3. A precision hub clampable in any desired angular position on a supporting shaft comprising:
   a hub body having a bore therein;
   a radial first slot extending through a substantial portion of said body;
   a second slot extending through a substantial portion of said body in a plane inclined inwardly toward and at an acute angle to said radial slot and intersecting it at only one side of said hub body, said second slot intersecting the end face of the hub body opposite said first slot outside of said bore;
   and means for drawing together portions of said body on opposite sides of said inclined slot in the vicinity of its intersection with said radial slot to clamp said hub on a supporting shaft.

4. A precision hub clampable in any desired angular position on a supporting shaft comprising:
   a hub body having a bore therein;
   a radial first slot extending through a substantial portion of said body;
   a second slot extending through a portion of said body greater than said radial slot in the plane thereof and lying in a plane inclined inwardly toward and at an acute angle to said radial slot and intersecting it at only one side of said hub body;
   and means for drawing together portions of said body on opposite sides of said inclined slot in the vicinity of its intersection with said radial slot to clamp said hub on a supporting shaft.

5. A precision hub clampable in any desired angular position on a supporting shaft comprising:
   a hub body having a bore therein;
   a radial first slot extending through a substantial portion of said body;
   a second slot extending through a substantial portion of said body in a plane inclined inwardly toward and at an acute angle to said radial slot and intersecting it at only one side of said hub body;
   and a clamping screw passing through a portion of said body on one side of said inclined slot in the vicinity of its intersection with said radial slot and threaded into the portion of the body on the opposite side thereof for drawing said portions together to clamp said hub on a supporting shaft.

6. A precision flanged hub clampable in any desired angular position on a supporting shaft comprising:
   a hub body having a bore therein;
   a radial first slot extending through a substantial portion of said body adjacent the flange thereof;
   a second slot extending through a substantial portion of said body in a plane inclined inwardly toward and at an acute angle to said radial slot and intersecting it at only one side of said hub;
   and means for drawing together portions of said body on opposite sides of said inclined slot in the vicinity of its intersection with said radial slot to clamp said hub on a supporting shaft.

7. A precision gear clampable in any desired angular position on a supporting shaft comprising:
   a gear body including an integral hub and having a bore therein;
   a radial first slot extending through a substantial portion of said hub adjacent the gear thereof;
   a second slot extending through a substantial portion of said hub in a plane inclined inwardly toward and at an acute angle to said radial slot and intersecting it at only one side of said hub;
   and means for drawing together portions of said hub on opposite sides of said inclined slot in the vicinity of its intersection with said radial slot to clamp said gear on a supporting shaft.

References Cited by the Examiner

UNITED STATES PATENTS 3,139,296   6/1964   Greene _____ 287—52

FOREIGN PATENTS 918,875   2/1963   Great Britain.

DAVID J. WILLIAMOWSKY, *Primary Examiner.*

L. H. GERIN, *Assistant Examiner.*